Feb. 15, 1938.  E. D. DOYLE ET AL  2,108,294
METHOD AND APPARATUS FOR MEASURING ION CONCENTRATION
Filed Jan. 11, 1936

Inventors
Edgar D. Doyle and
George A. Perley
By Cornelius D. Ehret
Attorney

Patented Feb. 15, 1938

2,108,294

UNITED STATES PATENT OFFICE 2,108,294

METHOD AND APPARATUS FOR MEASURING ION-CONCENTRATION

Edgar D. Doyle and George A. Perley, Philadelphia, Pa., assignors to Leeds & Northrup Company, Philadelphia, Pa., a corporation of Pennsylvania Application January 11, 1936, Serial No. 58,623

8 Claims. (Cl. 204—5)

Our invention relates to methods of and apparatus for measuring the ion-concentration of a solution.

In accordance with our invention, the solution may be continuously supplied by a suitable system of pipes, conduits or the like, to an ion-concentration cell included in an electrical measuring system, and to avoid false measurements due to extraneous potentials, it is provided that at least one of the systems has high insulation resistance to ground.

More particularly in accordance with our invention, to avoid potential effects unrelated to the ion-concentration of the solution, the electrodes of the ion-concentration cell are isolated from ground, and when the solution flows through a grounded conduit, it is delivered to, and discharged from the ion-concentration cell in streams which are broken up into drops or which are equivalently discontinuous.

More particularly, the electrodes of the ion-concentration cell are connected in circuit with the input electrodes of an amplifier tube, preferably of a type having high input impedance, and a calibrated source of voltage, adjustable to balance the voltage of said cell.

Our invention further resides in the features of combination and arrangement hereinafter described and claimed.

For an understanding of our invention, reference is made to the accompanying figures of drawing which diagrammatically illustrate ion-concentration measuring systems utilizing the invention.

Figure 1:
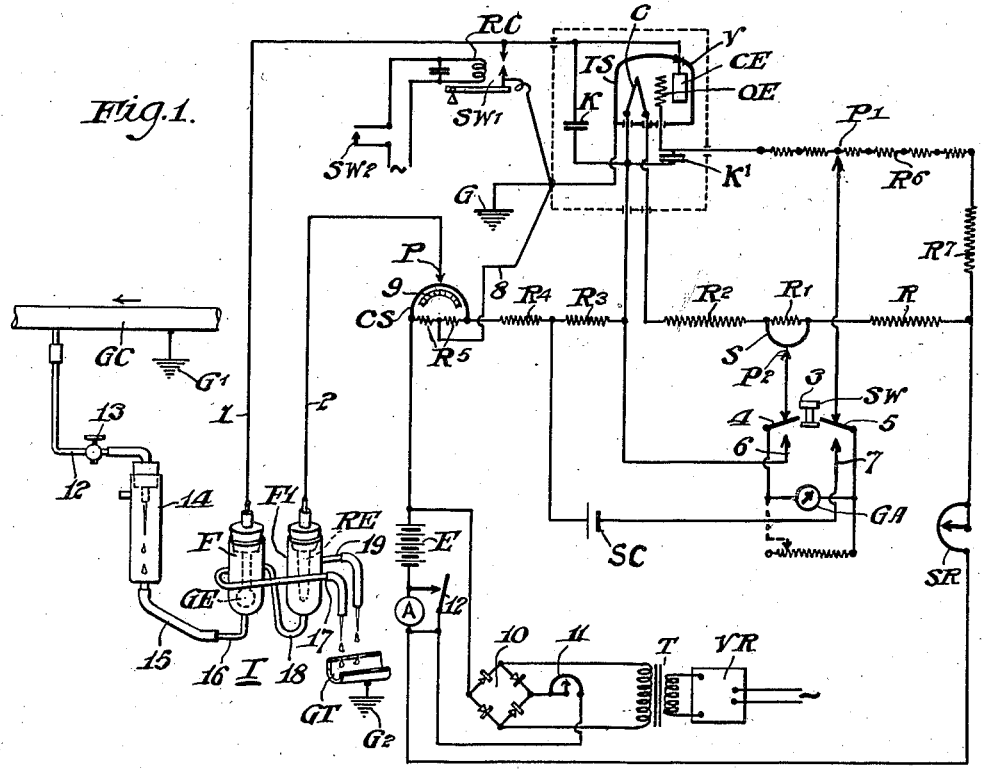

Referring to Figure 1, the ion-concentration cell I comprises the glass electrode GE and the reference electrode RE, preferably of the calomel type. The housing F which contains the electrode and the solution whose ion-concentration is to be measured, is of insulating material, such as glass, bakelite, or the like. The glass electrode GE is connected as by conductor I to the control electrode CE of a vacuum tube V, preferably of the type having a high input impedance, such as the Westinghouse type DRH506 tube. The input impedance of tube V is of the next order above the order of the impedance of the ion-concentration cell which is from about 2 to about 30 megohms. The other electrode of the cell I is connected by conductor 2 to the contact P adjustable along the slidewire CS connected through resistors R3, R4 to the cathode C of tube V. The slidewire CS is connected in series with resistances R, R1, R2, R3, R4 across the source of voltage E. Current from the battery through the slidewire CS is suitably calibrated, as hereinafter described, so that by adjustment of the contact P, the voltage of the ion-concentration cell can be balanced.

The output electrode OE of tube V is connected through resistances R6 and R7 with the positive terminal of the source of voltage E. The galvanometer GA, or equivalent electro-responsive device, is connected to contact P1 adjustable along resistance R6, and to contact P2 adjustable along the slidewire S in shunt to resistance R1. The output impedance of tube V is of an order substantially lower than the impedance of the ion-concentration cell and therefore better suited to work into the network which includes the galvanometer GA, or equivalent electro-responsive device.

To calibrate current through the slidewire CS, so that it becomes in effect a calibrated source of voltage in the input circuit of the tube, the button of switch SW is depressed so that the movable contacts 4, 5, connected to galvanometer GA, engage the contacts 6, 7 of the calibrating circuit including the standard cell SC. The calibrating resistance SR is then adjusted until the voltage drop across resistance R3, due to the flow of current from battery E, is equal to the voltage of the standard cell SC, as indicated by a null deflection of galvanometer GA.

To adjust the system for the tube constants, the switch SW1 is closed to connect the control electrode CE to ground G. Then, for a desired setting of contact P1, switch SW being in the upper position shown, the contact P2 is adjusted along slidewire S until there is a null deflection of galvanometer GA.

As shown in Fig. 1, the internal shield IS of the tube is connected to ground, and calibrating source of potential CS, in the control electrode circuit of the tube, is connected also to ground G, as by conductor 8 which extends to an intermediate point of resistance R5 which is in shunt to slidewire CS.

When the ion-concentration cell is of the type using a silver silver-chloride electrode, conductor 8 is connected to a terminal of slidewire CS instead of to a point whose potential is intermediate the terminal potentials of the slidewire.

After the system has been calibrated and adjusted to the tube constants, as described, the ion-concentration of the solution in the cell I is determined by adjusting contact P along slidewire CS until there is no galvanometer deflection. The ion-concentration, for example, hydrogen ion-concentration, is then read in suitable units from the scale or chart 9.

The source of voltage E may, as shown, be a battery capable of supplying constant current for suitably long intervals of time. If desired, the battery may be connected across a charging system comprising rectifiers 10 supplied from a secondary of a transformer T connected to a suitable source of alternating voltage preferably through a voltage regulating device VR. The amount of current supplied by the rectifier system may be adjusted by resistance 11. If desired, the battery E may be allowed to float across the charging system during measurements, particularly if voltage regulator VR or equivalent is used. With switch 12 open, the ammeter A indicates the difference between charging or discharging of the battery. As shown, the cathode C of the tube may be heated from the same source of current E, and since the cathode of the particular tube shown is of the directly heated type, it is connected in series with resistances R—R5, intermediate the resistances R2, R3.

Preferably, condenser K having a capacity of about 0.03 microfarad and an insulation resistance of at least 200 megohms, is connected between the control electrode CE and the cathode C of the tube, and condenser K1 having a capacity for example of about 0.2 microfarad, is connected between the output electrode OE and the cathode of the tube. These condensers bypass alternating currents which may be induced in the leads to the electrodes CE and OE from neighboring circuits or electrical apparatus and which would otherwise be rectified by the tube with consequent errors of measurement.

As thus far described, the ion-concentration cell may be of type in which a batch of the solution whose ion-concentration is to be measured, is placed within the housing of the ion-concentration cell. Since the housing, as above stated, is of insulating material, the electrodes in the solution therein are suitably insulated from ground, thus avoiding any faults of secondary potential effects which would result in a false balance of the system and give an erroneous reading of the ion-concentration.

The system shown in Fig. 1, is adapted for measurement of the ion-concentration of a solution flowing in conduit GC grounded as conventionally shown by symbol G1. Accordingly, the housing of the ion-concentration cell is provided with suitable inlets and outlets to allow a stream of the solution from the conduit to pass through the ion-concentration cell. The housing or flow-channel specifically illustrated is of the type disclosed and claimed in co-pending application Serial No. 58,554, filed January 10, 1936. It is characteristic of the flow-channel that the electrode GE is in a region of high turbulence of the incoming solution and its sensitivity is therefore maintained high to changes of ion-concentration. The turbulence is increased by the air entrained by the falling drops in tube 14.

A stream from the solution flowing through grounded conduit GC is diverted therefrom by the pipe 12 preferably having a valve 13. The end of pipe 12 terminates in the upper end of a chamber 14 suitably insulated from ground, the stream breaking into drops as it falls into the lower end of the chamber, the drops reforming into a stream which flows through pipe 15 to the inlet 16 of the flow-channel or housing F of the ion-concentration cell.

The solution, upon entering the flow-channel, as described and claimed in aforesaid copending application Serial No. 58,554, directly impinges upon the active surface of the glass electrode GE and then divides, part of the solution passing to the outlet pipe 17 from whose end it flows in a stream broken into drops into the collecting trough GT, or equivalent, which may be grounded as conventionally shown by symbol G2. The other portion of the stream passes through the intermediate pipe 18 into a second chamber F1 of the flow-channel in which the reference electrode RE is disposed. The solution passes from chamber F1 into the outlet pipe 19 from which it flows in a stream, broken into drops, into the collecting trough GT or other collector which may be grounded as conventionally shown by symbol G2.

Since the stream of solution flowing from the grounded conduit GC to the flow-channel F is discontinuous because broken into drops, there is substantially infinite resistance between the ground G1 and the solution in the flow channel; similarly, since the streams of solution flowing from the ion-concentration cell to the collecting trough GT are broken into drops, there is substantially infinite resistance between the ground G2 and the solution in the flow-channel of the cell. Accordingly, there are avoided any secondary potential effects which would result in a false position of balance of the contact P. For accurate measurements of the ion-concentration, it is essential that these false potential effects be avoided. Theoretically if either the system for supplying solution to the ion-concentration cell or the electrical system including the cell electrodes, tube V and the network associated therewith, have high insulation resistance to ground, or both have high insulation resistance to ground, these false effects can be avoided. Practically, it is difficult or inconvenient to procure and maintain high insulation resistance of all components of the measuring circuits and apparatus with respect to ground. In the preferred arrangement, the insulation resistance of the system supplying solution to the cell is maintained high by breaking the supply and discharge stream into drops; the connection of the measuring circuit to ground G is not essential, though desirable.

When continuous measurements are to be made, there may be utilized recorder mechanism preferably of the type shown in Squibb Patent 1,935,732, having mechanical relay mechanism suited to effect adjustment of contact P in response to deflections of galvanometer GA. When a recorder of the Squibb type is used, the calibrating switch shown in Figs. 13 and 14 of the Squibb patent may be used to adjust our system for any changes that may occur in the tube constants during operation. Specifically, the calibrating switch of the Squibb patent may be used as our switch SW2 to effect intermittent energization of the relay coil RC to effect closure of switch SW1. The mechanical relay mechanism shown in the Squibb patent is, during this time, effectively interposed between the galvanometer GA and the contact P2 to effect readjustment of contact P2.

Automatic adjustment of zero of a detector of the character and for purposes herein described, effected herein by adjustment of the contact P2 along slidewire S to produce null deflection of galvanometer GA, forms no part of the present invention; it is disclosed and claimed in co-pending application Serial No. 128,636, filed March 2, 1937, of Albert J. Williams, Jr., owned by the assignee of the present application.

If desired, a control may be effected in accordance with or in response to deflections of the galvanometer; for example, automatic control of the ion-concentration may be effected generally as shown in Keeler Patent No. 1,530,833.

Figure 2:
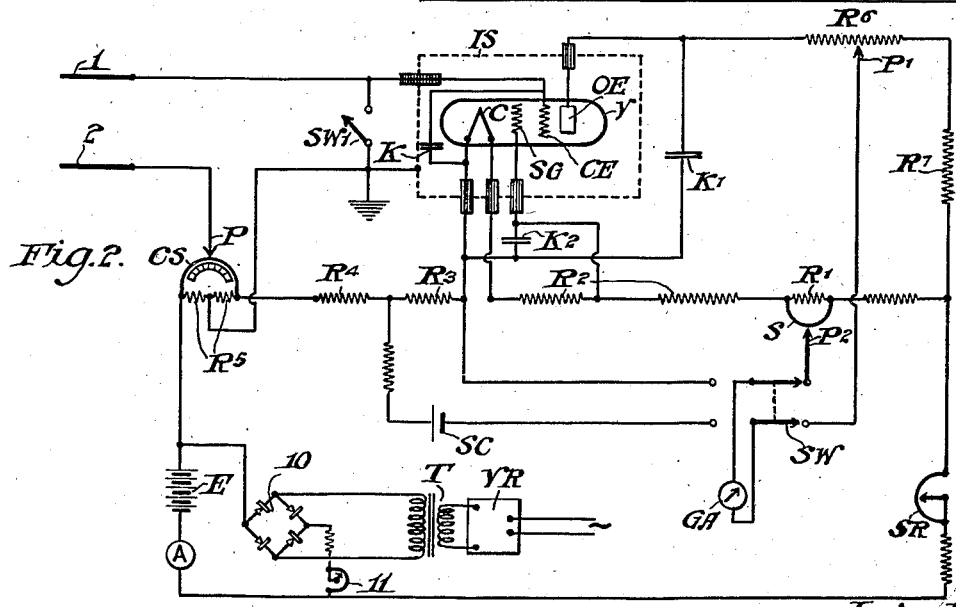

The system shown in Fig. 2 is similar to that shown in Fig. 1 except the tube V is of the General Electric type FP54 having an accelerating grid SG which is connected to an intermediate tap of resistance R2. In this tube, the control electrode CE is a grid-element and the output electrode OE is a plate-element. The two grids and the plate are preferably by-passed by condensers K, K1 and K2 having respectively capacities of the order of 0.003 microfarad, 1 microfarad and 1 microfarad. Condenser K should have high insulation resistance, for example not less than about 200 megohms; a mica type condenser is usually satisfactory.

The calibration, adjustment and operation of the system are substantially the same as described in connection with Fig. 1.

While preferred arrangements are illustrated, it is to be understood our invention is not limited thereto, but is coextensive in scope with the appended claims.

What we claim is:

1. A system for continuous measurement of the ion-concentration of a solution comprising an ion-concentration cell, a circuit including said ion-concentration cell and a calibrated source of variable voltage, means for indicating unbalance between the voltages of said source and said cell, means for insulating the electrodes of said cell from ground, and means for feeding the solution to, and discharging it from, said cell in streams which are broken into drops to avoid a conductive path from said electrodes to ground through the solution.

2. A system for continuous measurement of the ion-concentration of a solution comprising an ion-concentration cell having a flow-channel and electrodes disposed therein, a circuit including said ion-concentration cell and a calibrated source of variable voltage and means for feeding the solution to, and discharging it from, said flow-channel in streams which are broken into drops.

3. A system for measurement of the ion-concentration of a solution comprising an ion-concentration cell having a flow-channel and electrodes therein, a thermionic tube, connections from the electrodes of said cell to input electrodes of said tube, a calibrated source of voltage included in one of said connections and connected to ground, and means for feeding the solution to, and discharging it from, said flow-channel in streams broken into drops.

4. A system for continuous measurement of the ion-concentration of a solution flowing in a grounded conduit comprising an ion-concentration cell having a flow-channel and electrodes therein, a thermionic tube, connections from the electrodes of said cell to input electrodes of said tube, a calibrated source of voltage included in one of said connections and directly connected to ground, means for transferring a stream of solution from said conduit to said flow-channel including means for breaking the stream into drops, and means for effecting discharge of the solution from said flow-channel in a stream broken into drops.

5. A system for continuous measurement of the ion-concentration of a solution flowing in a grounded conduit comprising an ion-concentration cell having a flow-channel and electrodes, a tube having a control electrode connected to an electrode of said cell, a calibrated source of voltage connected between the cathode of said tube and another electrode of said cell, a connection from an intermediate terminal of said source to ground, and means for delivering solution to said flow-channel from said conduit and for discharging it from said flow-channel in streams broken into drops.

6. A system for continuous measurement of the ion-concentration of a solution flowing in a grounded conduit comprising an ion-concentration cell having a flow-channel, a glass electrode, and a reference electrode, an electro-responsive device, a vacuum tube having an input impedance of the order of the impedance of said cell and an output impedance of the order of the impedance of said electro-responsive device, connections for including said electro-responsive device in the output circuit of said tube, a connection from said glass electrode to the control electrode of said tube, a calibrated source of voltage connected to the cathode of said tube, a connection from said reference electrode to an adjustable point of said source of voltage, a connection from said source of voltage to ground, and means for delivering solution from said conduit to said flow-channel and for discharging solution from said flow-channel in streams which are broken into drops.

7. A system for continuous measurement of the ion-concentration of a solution flowing in a grounded conduit comprising an ion-concentration cell having a flow-channel and electrodes therein, a tube having a control electrode connected to an electrode of said cell, a calibrated source of voltage connected between the cathode of said tube and another electrode of said cell, a connection from a terminal of said source to ground, and means for delivering solution to said flow-channel from said conduit and for discharging it from said flow-channel in streams broken into drops.

8. In the art of measuring the ion-concentration of a solution flowing in grounded conduit by a system including an ion-concentration cell in the input system of a vacuum tube, the method of avoiding potential effects unrelated to the ion-concentration which comprises insulating the electrodes of said cell from ground, delivering the solution from said conduit to said cell in a stream broken into drops, and discharging the solution from said cell in a stream broken into drops.

EDGAR D. DOYLE.
GEORGE A. PERLEY.